(No Model.)
J. R. THOMPSON.
CHURN.
No. 271,544. Patented Jan. 30, 1883.
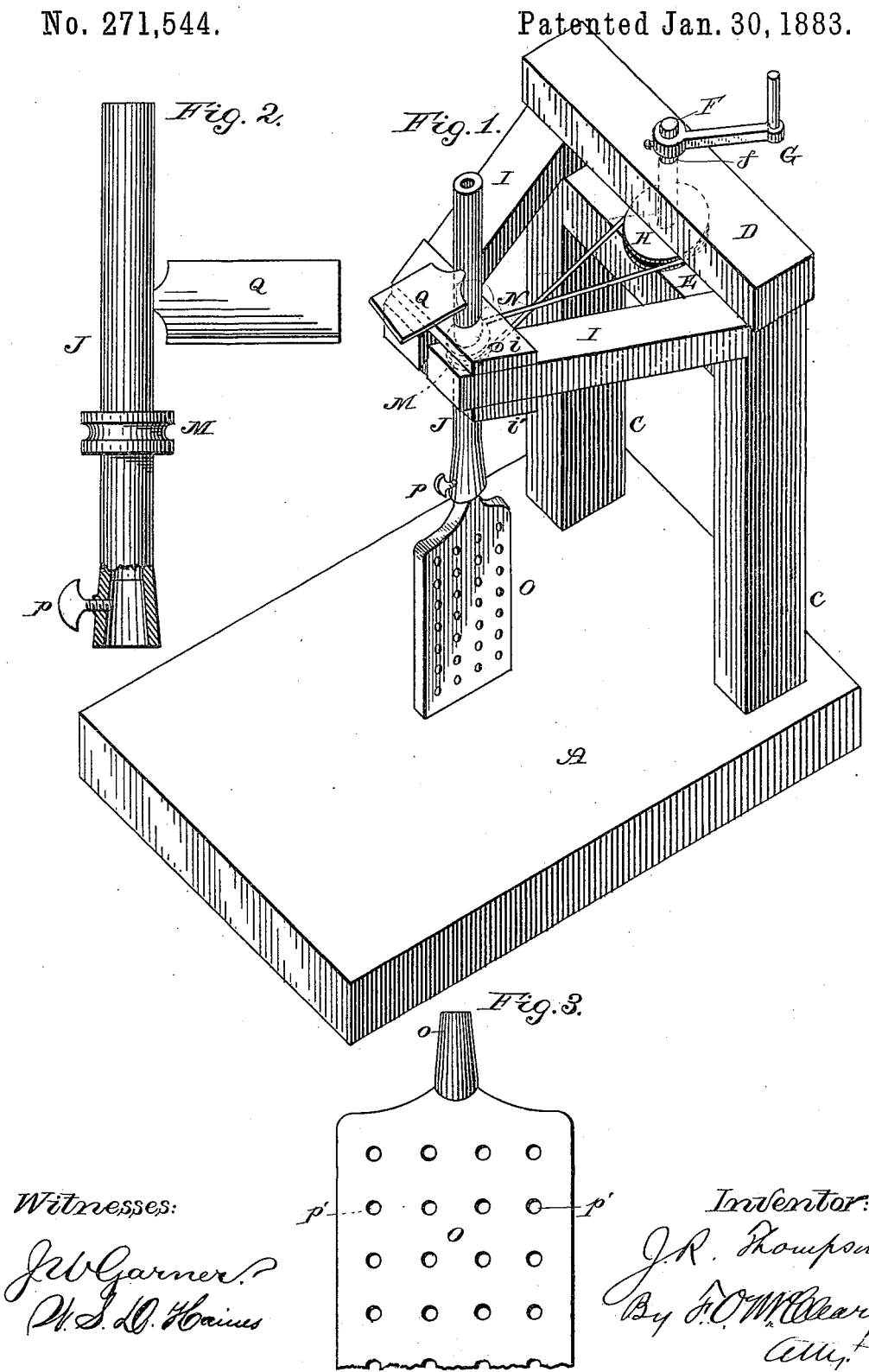
Witnesses:
J. W. Garner
W. S. D. Haines
Inventor:
J. R. Thompson
By F. O. W. Cleary
Atty.

UNITED STATES PATENT OFFICE.

JOHN R. THOMPSON, OF UNION COUNTY, KENTUCKY.

CHURN.

SPECIFICATION forming part of Letters Patent No. 271,544, dated January 30, 1883.

Application filed June 12, 1882. (No model.)

*To all whom it may concern:*

Be it known that I, JOHN ROWAN THOMPSON, a citizen of the United States, residing in the county of Union and State of Kentucky, have invented certain new and useful Improvements in Churns; and I do hereby declare the following to be a full, clear, and exact description of the invention, such as will enable others skilled in the art to which it pertains to make and use the same.

My invention relates to churn-dashers and means for operating the same, the object being to provide a dasher, in combination with operating devices, so constructed as to be strong and durable, and fully protected to prevent all liability of disarrangement or breakage of the parts, and adapted to impart a reciprocating rotary motion to the dasher, whereby a thorough agitation of the cream is effected and the butter collected in the minimum amount of time and with comparatively little labor.

The invention consists in the improved construction and combination of parts hereinafter fully described, and pointed out in the claims.

In the drawings, Figure 1 is a perspective view of a dasher and operating devices constructed in accordance with my invention. Figs. 2 and 3 represent parts in detail.

A represents the churn-base, upon which the churn proper is adapted to be secured. At one end of the base A are arranged two parallel standards, C C, having at their upper ends a cross-bar, D, and below the latter a parallel cross-bar, E.

F represents a vertical shaft, mounted in bearings $f$ in the cross-bars D and E, at the center of the latter. This shaft projects above the bar D to receive a crank, G, (or a drive-wheel may be mounted thereon in lieu of the crank when other than hand-power is to be used.) A grooved driving-wheel, H, is mounted rigidly on the shaft F, between the parallel bars D and E, to receive a belt, as will be further described hereinafter.

From the inner sides of the standards C C project at opposite angles two supporting-arms, I I. These arms extend inwardly to a point over the center of the base A, where they are connected by plates $i$ $i'$, secured respectively to the upper and under sides of said arms, and centrally perforated to receive the handle or shaft J of the dasher. Said shaft J is provided with an annular grooved collar, M, formed integral with the shaft, and adapted to bear on the lower plate, $i'$, to support the shaft. A crossed belt, N, is adapted to be passed around the wheel H and grooved collar M to impart a reciprocating rotary movement to the dasher when the crank is reciprocated. The shaft J is formed hollow at its lower end to receive the upper end, $o$, of the dasher O, which latter is adjustably and removably secured within the shaft by a thumb-screw, $p$. The dasher O is preferably of rectangular form, with flat sides and a tapering cylindrical upper end, $o$, and said dasher is provided with any desired number of perforations, $p'$, to aid in the agitation and mixing of the cream. The dasher as thus constructed is adapted to be given a reciprocating rotary movement, as above described, which I have found to be most advantageous with the peculiar dasher shown. The flat sides of the latter give a broad sweep to the dasher, the cream running through the perforations, and the continual reversal of the movement operates to thoroughly agitate the cream and speedily collect the butter.

Q represents a fan, which may be inserted in a perforation in the upper end of the shaft, to be operated with the latter.

It will be observed that the grooved wheel and belt are protected by the arms and cross-bars, and the grooved collar of the dasher-shaft is covered by the plates $i$ $i'$ and the arms, so that all liability of disarrangement of the parts is avoided and a simple and a durable churn-motor produced.

What I claim as new, and desire to secure by Letters Patent, is—

1. The combination, in a churn, of the dasher-rod J, having a collar, M, and provided at its lower end with a recess, and thumb-screw P, with a rectangular perforated dasher constructed of one piece, and having the tapering portion $o$, substantially as and for the purpose set forth.

2. In a churn, the combination, with the base and standards, of parallel cross-bars supporting a vertical shaft, a grooved wheel mounted on said shaft between the standards and cross-bars, two inwardly-projecting inclined arms, I I, provided with upper and lower perforated connecting-plates, a dasher-shaft provided with a grooved collar and having bearings in the perforations of said plates, the collar of the said shaft being located between said plates, as described, an operating-belt connecting said collar and grooved wheel and located between the arms I I, and a dasher removably secured to its shaft, substantially as set forth.

In testimony whereof I have signed this specification in the presence of two subscribing witnesses.

JOHN R. THOMPSON.

Witnesses:
J. B. WAGGENER,
P. B. WALLER.